United States Patent
Matsuura

(10) Patent No.: US 12,420,560 B2
(45) Date of Patent: Sep. 23, 2025

(54) PRINTING APPARATUS, PRINTING METHOD AND MEDIUM FOR PREVIEWING CHANGE IN IMAGE QUALITY

(71) Applicant: BROTHER KOGYO KABUSHIKI KAISHA, Nagoya (JP)

(72) Inventor: Kazunari Matsuura, Komaki (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 151 days.

(21) Appl. No.: 18/456,676

(22) Filed: Aug. 28, 2023

(65) Prior Publication Data

US 2024/0092087 A1 Mar. 21, 2024

(30) Foreign Application Priority Data

Sep. 15, 2022 (JP) .................................. 2022-147138

(51) Int. Cl.
*B41J 2/21* (2006.01)
*G06F 3/12* (2006.01)

(52) U.S. Cl.
CPC .............. *B41J 2/21* (2013.01); *G06F 3/1208* (2013.01); *G06F 3/1242* (2013.01); *G06F 3/1256* (2013.01); *G06F 3/1263* (2013.01); *G06F 3/1275* (2013.01)

(58) Field of Classification Search
CPC ........ B41J 2/21; G06F 3/1208; G06F 3/1242; G06F 3/1256; G06F 3/1263; G06F 3/1275
See application file for complete search history.

(56) References Cited

U.S. PATENT DOCUMENTS

| | | | |
|---|---|---|---|
| 2015/0029524 A1* | 1/2015 | Shin | G06K 15/1878 |
| | | | 358/1.9 |
| 2015/0042705 A1 | 2/2015 | Owada | |
| 2018/0275932 A1* | 9/2018 | Oropesa | G06F 3/1254 |
| 2020/0307257 A1 | 10/2020 | Tamaki | |
| 2020/0307282 A1 | 10/2020 | Tamaki | |
| 2021/0365218 A1* | 11/2021 | Sutherland | G06F 3/04842 |
| 2023/0185493 A1* | 6/2023 | Kurata | G06F 3/1256 |
| | | | 358/1.13 |

FOREIGN PATENT DOCUMENTS

| | | |
|---|---|---|
| JP | 2006-270222 A | 10/2006 |
| JP | 2010-194810 A | 9/2010 |
| JP | 2017-189984 A | 10/2017 |
| JP | 2018-056935 A | 4/2018 |
| JP | 2020-163579 A | 10/2020 |

* cited by examiner

*Primary Examiner* — Nicholas Pachol
(74) *Attorney, Agent, or Firm* — Scully, Scott, Murphy & Presser, PC

(57) ABSTRACT

There is provided a printing apparatus including: a first nozzle configured to discharge an ink of a basic color; a second nozzle configured to discharge an ink of a special color; and a controller. The controller is configured to execute: a processing of causing a display to display a first preview image together with a second preview image, the first preview image corresponding to a first image to be formed by the ink of the basic color, the second preview image corresponding to a second image to be formed by the ink of the basic color and the ink of the special color; and a processing of printing the first image by the first nozzle, or a processing of printing the second image by the first and second nozzles, based on a selected preview image selected, by a user, from the first and second preview images.

19 Claims, 8 Drawing Sheets

FIG. 2
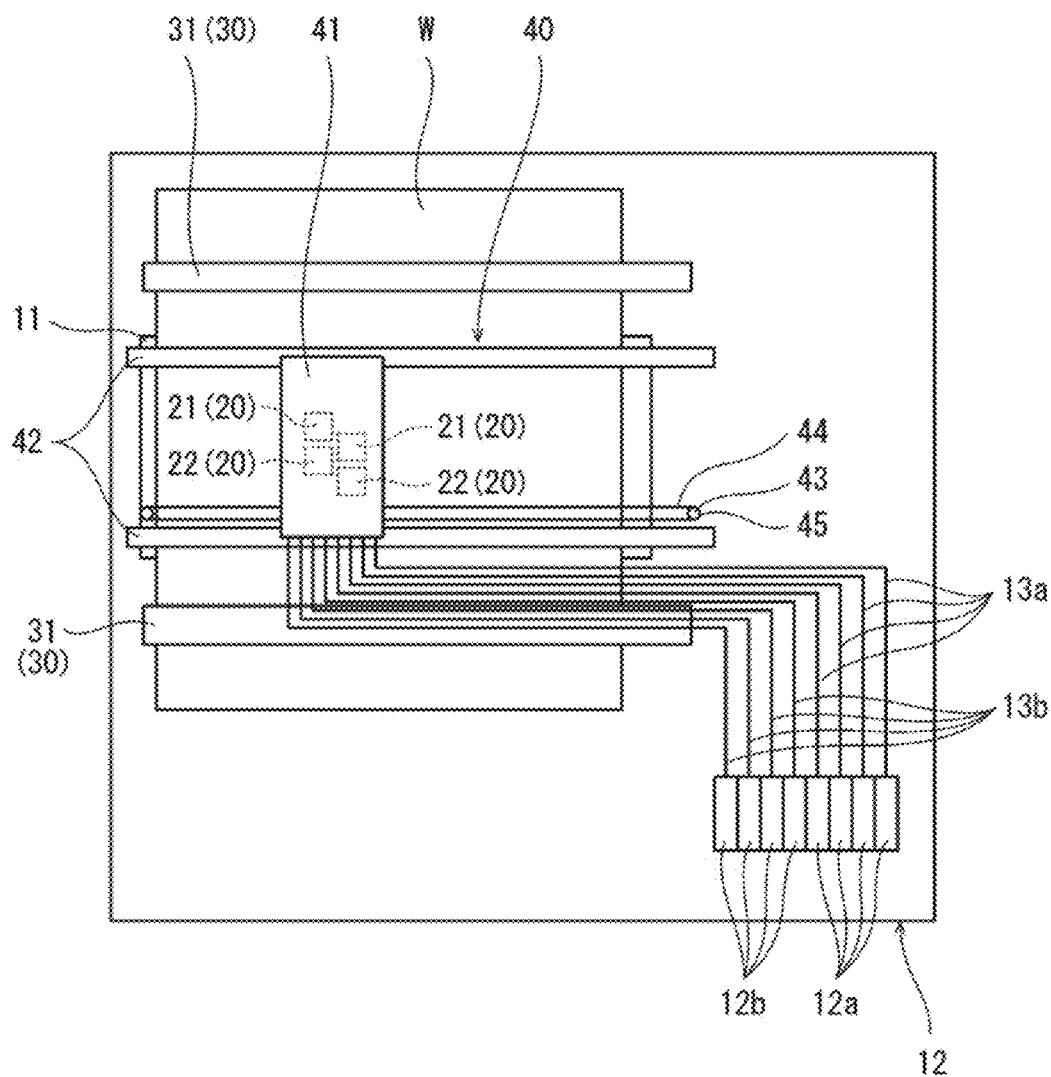
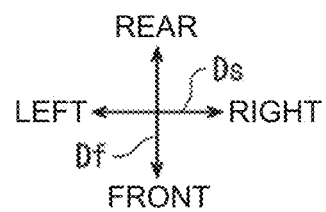

PRINTING APPARATUS, PRINTING METHOD AND MEDIUM FOR PREVIEWING CHANGE IN IMAGE QUALITY

REFERENCE TO RELATED APPLICATIONS

This application claims priority from Japanese Patent Application No. 2022-147138 filed on Sep. 15, 2022. The entire content of the priority application is incorporated herein by reference.

BACKGROUND ART

There is a known ink-jet printer including a first discharging head which discharges or ejects an ink of a predetermined basic color (basic color ink) onto a print medium based on image data, and a second discharging head which discharges or ejects an ink of a special color (special color ink) different from the basic color onto the print medium based on the image data. An image is formed by the basic color ink discharged onto the print medium by the first discharging head and the special color ink discharged onto the print medium by the second discharging head. Note that the basic color ink is exemplified by a cyan ink, a yellow ink, a magenta ink and a black ink. Further, the special color ink is exemplified by a red ink, a green ink, a blue ink, etc.

DESCRIPTION

In the conventional ink-jet printer, however, it is difficult for a user to recognize any change in the quality of an image (image quality) obtained by adding the special color ink in the formation of image. Due to this, there is such a problem that it is difficult to print an optimum image desired by the user.

In view of the above-described situation, an object of the present disclosure is to provide a printing apparatus, a printing method and a medium in each of which the change in the image quality depending on the presence or absence of addition of the special color ink is easily grasped.

According to an aspect of the present disclosure, there is provided a printing apparatus including:
  a first nozzle configured to discharge an ink of a basic color to a print medium based on image data;
  a second nozzle configured to discharge an ink of a special color different from the basic color to the print medium based on the image data; and
  a controller,
  wherein the controller is configured to execute:
  a processing of causing a display to display a first preview image together with a second preview image, the display being configured to display a preview image based on the image data, the first preview image corresponding to a first image to be formed by the ink of the basic color based on the image data, the second preview image corresponding to a second image to be formed by both of the ink of the basic color and the ink of the special color based on the image data; and
  a processing of printing the first image by using the first nozzle, or a processing of printing the second image by using the first nozzle and the second nozzle, based on a selected preview image selected, by a user, from the first preview image and the second preview image.

According to the present disclosure, the first preview image is displayed on the display together with the second preview image, and the user is capable of selecting either one of the first preview image and the second preview images. In this situation, in a case that the user determines that the change in image quality obtained by adding the special color ink is small, the user is capable of selecting the first preview image. In contrast, in a case that the user determines that the change in image quality obtained by adding the special color ink is great, the user is capable of selecting the second preview image. Owing to the foregoing, the user is capable of easily grasping the change in image quality depending on the presence or absence of addition of the special color ink.

According to the present disclosure, it is possible to provide a printing apparatus, a printing method and a medium in each of which the change in the image quality depending on the presence or absence of addition of the special color ink is easily grasped.

FIG. 2 is a plane view depicting a configuration including a discharging head provided in the printing apparatus of FIG. 1.

In the following, a printing apparatus related to an embodiment of the present disclosure will be explained, with reference to the drawings. The printing apparatus to be explained below is merely an embodiment of the present disclosure. Accordingly, the present disclosure is not limited to or restricted by the following embodiment, and any addition, deletion and/or change is/are possible within a range not departing from the spirit of the present disclosure.

Figure 1:
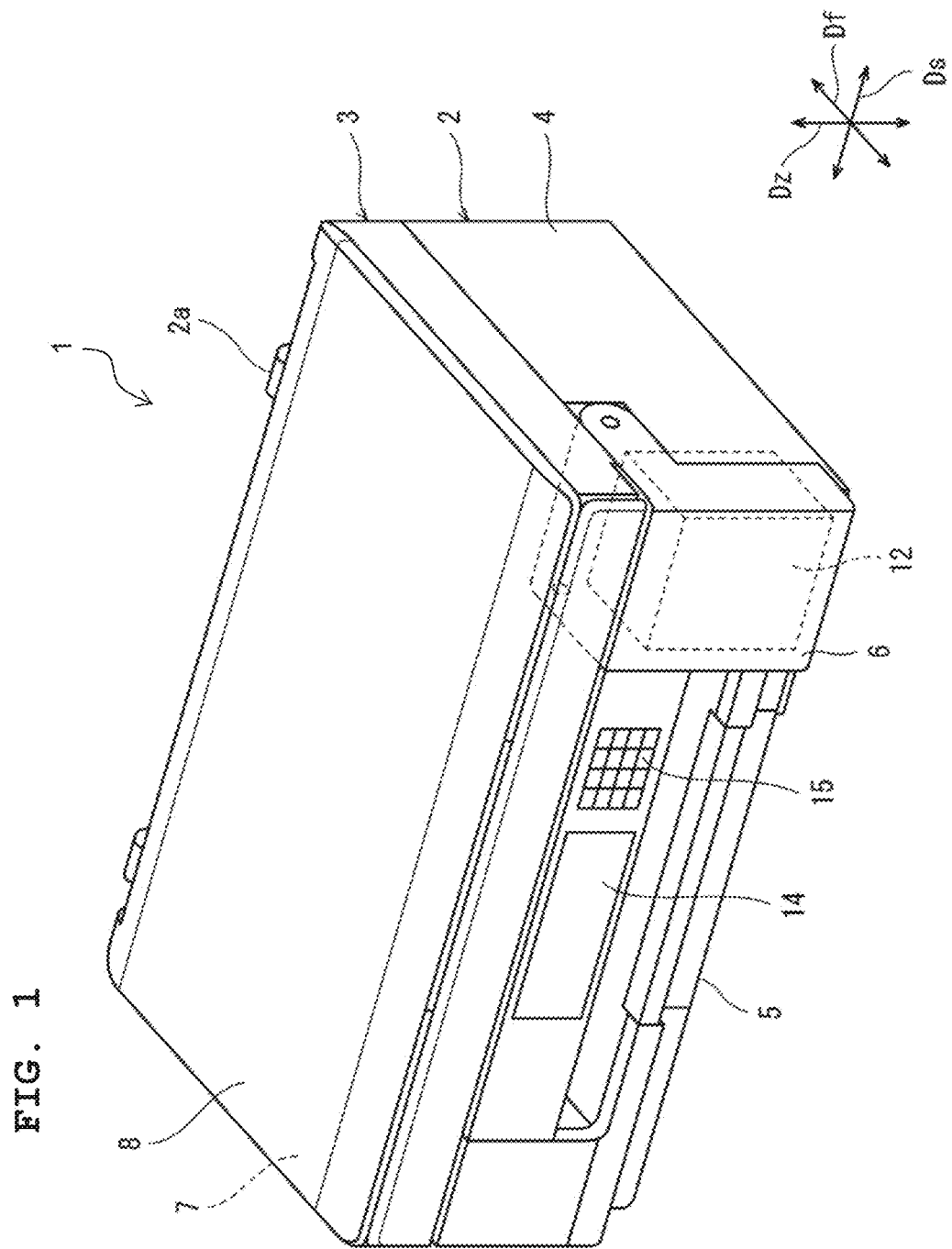
FIG. 1 is a perspective view depicting the outer appearance of a printing apparatus.

FIG. 1 is a perspective view depicting the outer appearance of a printing apparatus 1 related to an embodiment of the present disclosure. In FIG. 1, directions which are mutually orthogonal are referred to as a first direction Ds, a second direction Df and a third direction Dz. In the present embodiment, for example, the first direction Ds is a moving direction of a carriage 41 (to be described later on), the second direction Df is a conveying direction of a print medium W (to be described later on) and the third direction Dz is the up-down direction. In the following explanation, the first direction Ds is referred to as the moving direction Ds, the second direction Df is referred to as the conveying direction Df and the third direction Dz is referred to as the up-down direction Dz.

As depicted in FIG. 1, the printing apparatus 1 is, for example, an ink-jet printer which prints an image on the print medium W (see FIG. 2) such as, for example, printing paper sheet, etc., and has an outer appearance which is a shape of a rectangular parallelepiped. The printing apparatus 1 is provided with a printer unit 2 and a scanner unit 3. The printing apparatus 1 of FIG. 1 is a mere example, and the present disclosure is not limited to or restricted by this; for example, the printing apparatus 1 may be a printing apparatus provided with a printing part (discharging head) which discharges or ejects a droplet of an ultraviolet-curable ink (ultraviolet-curable ink droplet), and a light source which cures the ink droplet by an ultraviolet ray, etc.

The scanner unit 3 reads an image by an imaging element and generates image data. The generated image data is printed, at the printer unit 2, on the print medium W which is accommodated in the inside of the printing apparatus 1 or which is supplied from outside of the printing apparatus 1. Such a scanner unit 3 is arranged on the printer unit 2 to be overlapped with the printer unit 2, and is connected to the printer unit 2 by a connecting part 2a provided on a rear side part of the printer unit 2. With this, the scanner unit 3 is configured such that, in a case that a front part of the scanner unit 3 is lifted upward, the scanner unit 3 rotates (pivots) upward with respect to the printer unit 2, with the connecting part 2a as the fulcrum, to thereby expose the inner side of the printer unit 2.

The scanner unit 3 has a manuscript table (original table) 7 and a lid 8; the lid 8 is arranged so as to cover an upper part of the original table 7. The scanner unit 3 reads an image recorded on an original in a state that the original is arranged between the original table 7 and the lid 8.

The printer unit 2 prints an image on the print medium W by an ink supplied from a tank 12. The printer unit 2 has a case 4 forming a part of a casing of the printing apparatus 1. A cover 6 which opens and closes an opening part communicating with an internal space defined in the inside of the case 4 is attached to the case 4. A tray 5 which accommodates the print medium W is arranged in the inside of the case 4; the tray 5 is pulled or drawn frontward with respect to the case 4 to thereby make it possible to replenish or supplement the tray 5 with the print medium W.

The ink is stored in the tank 12. In a case that the cover 6 is opened, the tank 12 is thereby exposed to the outside. The tank 12 is connected to a discharging head 20 (see FIG. 2) via a channel so as to supply the ink to the discharging head 20.

As depicted in FIG. 2, the printing apparatus 1 is of the serial head system, and is provided with a plurality of pieces of the discharging head 20, a platen 11, a plurality of pieces of the tank 12, a conveying device 30 and a scanning device 40. The conveying device 30 corresponds to a "conveyor". Note that the printing apparatus 1 may be of the line head system. In such a case, the printing apparatus 1 is not provided with the scanning device 40, and the discharging head 20 is not moved and has a length in the moving direction Ds which is longer than a length of a print area of the print medium W.

The discharging heads 20 print an image on the print medium W based on the image data with a basic color ink (to be described later on). The discharging heads 20 include, for example, two first discharging heads 21 and two second discharging heads 22. The platen 11 has a flat upper surface, and defines a distance between the print medium W placed on the upper surface of the platen 11 and a lower surface of the discharging heads 20 provided so as to face the print medium W. The tank 12 is a container which stores the ink therein, and the number of the tank 12 is same as the number of a kind of the ink. For example, the tank 12 has four kinds of first tanks 12a each of which is configured to store one of four kinds of the basic color ink, and one piece or a plurality of pieces of a second tank 12b configured to store a special color ink.

The four kinds of the basic color ink are exemplified by a cyan ink, a yellow ink, a magenta ink and a black ink. On the other hand, the special color ink is an ink of which color is different from the color of the basic color ink, and is exemplified by a red ink, a green ink and a blue ink, etc.

Each of the first tanks 12a stores one of the basic color inks; the first tanks 12a are communicated with the first heads 21 by first channels 13a. The basic color inks are supplied from the first tanks 12a to the first discharging heads 21 via the first channels 13a. On the other hand, the second tanks 12b store the special color ink, and are communicated with the second discharging heads 22 via second channels 13b. The special color ink is supplied from the second tanks 12b to the second discharging heads 22 via the second channels 13b. Note that before the special color ink is stored in the second tanks 12b, a preservative liquid (preservative solution) different from the special color ink is filled in the second tanks 12b. Each of the first and second channels 13a and 13b is, for example, a rubber tube or a plastic tube, and may be a tube which has a strong bending durability.

Figure 3:
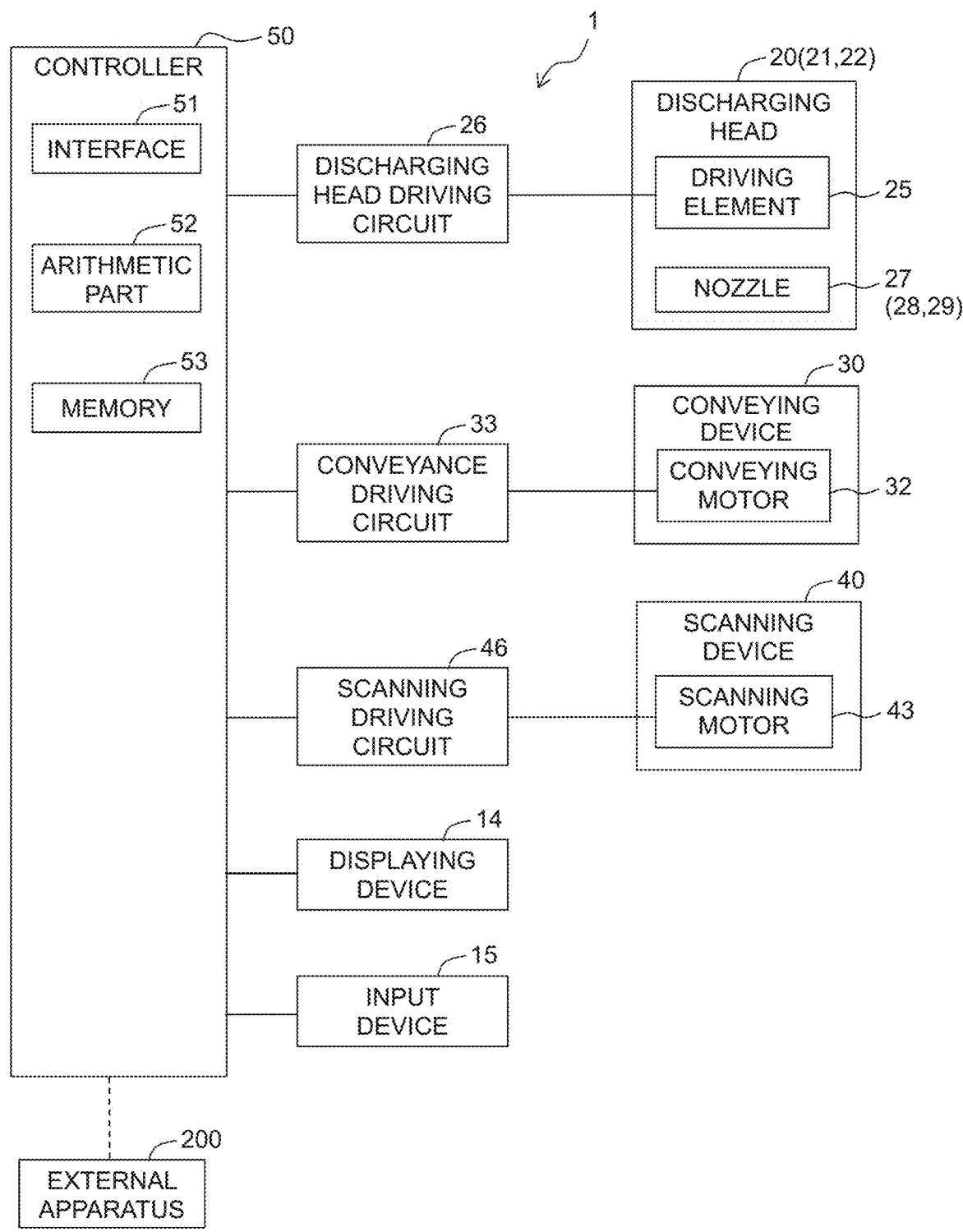
FIG. 3 is a block diagram depicting the configuration of a control system of the printing apparatus of FIG. 1.

The conveying device 30 has, for example, two sets of conveying rollers 31 and a conveying motor 32 (see FIG. 3). The two sets of conveying rollers 31 are arranged, with the platen 11 being interposed therebetween in the conveying direction Df (front-rear direction). Each of the conveying rollers 31 has a shaft extending in the moving direction Ds. The conveying rollers 31 of each of the two sets are arranged side by side in the up-down direction Dz so as to pinch the print medium W therebetween. One of the conveying rollers 31 of each of the sets is connected to the conveying motor 32. The conveying rollers 31 rotate, by driving of the conveying motor 32, with the shaft as the center of rotation, and convey the print medium W in the conveying direction Df on the platen 11.

The scanning device 40 has the carriage 41, two guide rails 42, a scanning motor 43 and an endless belt 44. The two guide rails 42 extend in the moving direction Ds, at a location above the platen 11, so that the recording heads 20 is interposed therebetween in the conveying direction Df. The carriage 41 holds the discharging heads 20 and is supported by the two guide rails 42 to be movable in the moving direction Ds. The endless belt 42 extends in the moving direction Ds, is attached to the carriage 41, and is attached to the scanning motor 43 via a pulley 45. In a case that the scanning motor 43 is driven, the endless belt 44 runs thereby, which in turn causes the carriage 41 to move reciprocally in the moving direction Ds along the guide rails 42. With this, the carriage 41 moves the discharging heads 20 in the moving direction Ds.

As depicted in FIG. 3, each of the discharging heads 20 has a plurality of nozzles 27 and a plurality of driving elements 25. Each of the plurality of driving elements 25 is a piezoelectric element, a heating element, an electrostatic actuator, etc., is provided to correspond to one of the plurality of nozzles 27, and applies, to the ink in one of the plurality of nozzles 27 corresponding thereto, a pressure for discharging an ink droplet of the ink from the one of the plurality of nozzles 27.

As described above, the discharging heads 20 include the two first discharging heads 21 and the two second discharging heads 22. Each of the first discharging heads 21 has a plurality of first nozzles 28 as nozzles 27 discharging the basic color inks to the print medium W, based on the image data. Further, each of the second discharging heads 22 has a plurality of second nozzles 29 as nozzles 27 discharging the special color ink to the print medium W, based on the image data.

The printing apparatus 1 is further provided with a displaying device 14, an input device 15 and a controller 50. The controller 50 corresponds to a "computer", and has an interface 51, an arithmetic part 52 and a memory 53. Further, the displaying device 14 corresponds to a "display". The interface 51 receives a variety of kinds of data, such as image data, etc., from an external apparatus 200 such as a computer, a camera, a communication network, a recording medium, a display, a printer, etc. The image data is, for example, raster data indicating an image to be printed on the print medium W, etc., and includes information of a print condition including a kind of the print medium W, etc. Note that the controller 50 may be constructed of a single apparatus or device, or may be configured such that a plurality of devices is arranged in a dispersed manner and that the plurality of devices cooperates to perform an operation of the printing apparatus 1.

The memory 53 is a memory accessible from the arithmetic part 52 and has a RAM and a ROM. The RAM temporarily stores a variety of kinds of data which are, for example, data received from the external apparatus 200 such as the image data, and data converted by the arithmetic part 52, etc. The ROM stores a printing program for performing a variety of kinds of data processing, predetermined data, etc. Note that the printing program may be stored, for example, in an external storage medium which is different from the memory 53 and which is accessible from the arithmetic part 52, such as, for example, a CD-ROM, etc.

The arithmetic part 52 includes at least one circuit which is, for example, a processor such as a CPU, an integrated circuit such as an ASIC, etc. The arithmetic part 52 executes the printing program to thereby control respective parts or components and to thereby executes various operations such as a printing operation. In the present embodiment, the arithmetic part 52 corresponds to the "computer", a "display controller" and a "print controller".

The displaying device 14 is, for example, a display, etc., and displays an image related to the image data and a preview image (to be described later on), in accordance with an instruction of the controller 50. The input device 15 is, for example, a button, etc., and is operated by a user. The input device 15 may be a touch panel integrated with the displaying device 14.

The controller 50 is electrically connected to the conveying motor 32 of the conveying device 30 via a conveyance driving circuit 33, and controls the driving of the conveying motor 32. With this, conveyance of the print medium W by the conveying device 30 is controlled. Further, the controller 50 is electrically connected to the scanning motor 43 of the scanning device 40 via a scanning driving circuit 46, and controls the driving of the scanning motor 43. With this, the movement of the discharging heads 20 by the scanning device 40 is controlled. Furthermore, the controller 50 is electrically connected to each of the plurality of driving elements 25 via a discharging head driving circuit 26. The controller 50 outputs a control signal of each of the plurality of driving elements 25 to the discharging head driving circuit 26; the discharging head driving circuit 26 generates a driving signal based on the control signal and outputs the driving signal to each of the plurality of driving elements 25. Each of the plurality of driving elements 25 is driven in accordance with the driving signal to thereby cause the ink droplet to be discharged from one of the plurality of nozzles 27 corresponding thereto.

The controller 50 obtains the image data, and causes a preview image to be displayed based on the image data, and executes the printing processing. In a printing pass, the controller 50 causes the discharging heads 20 to discharge the ink droplets onto the print medium W while causing the discharging heads 20 to move in the moving direction Ds. Further, in a conveying operation, the controller 50 causes the print medium W to be conveyed frontward in the conveying direction Df. In such a manner, the printing apparatus 1 alternately repeats the printing pass and the conveying operation. With this, an image related to the image data is printed on the print medium W.

Figure 4:
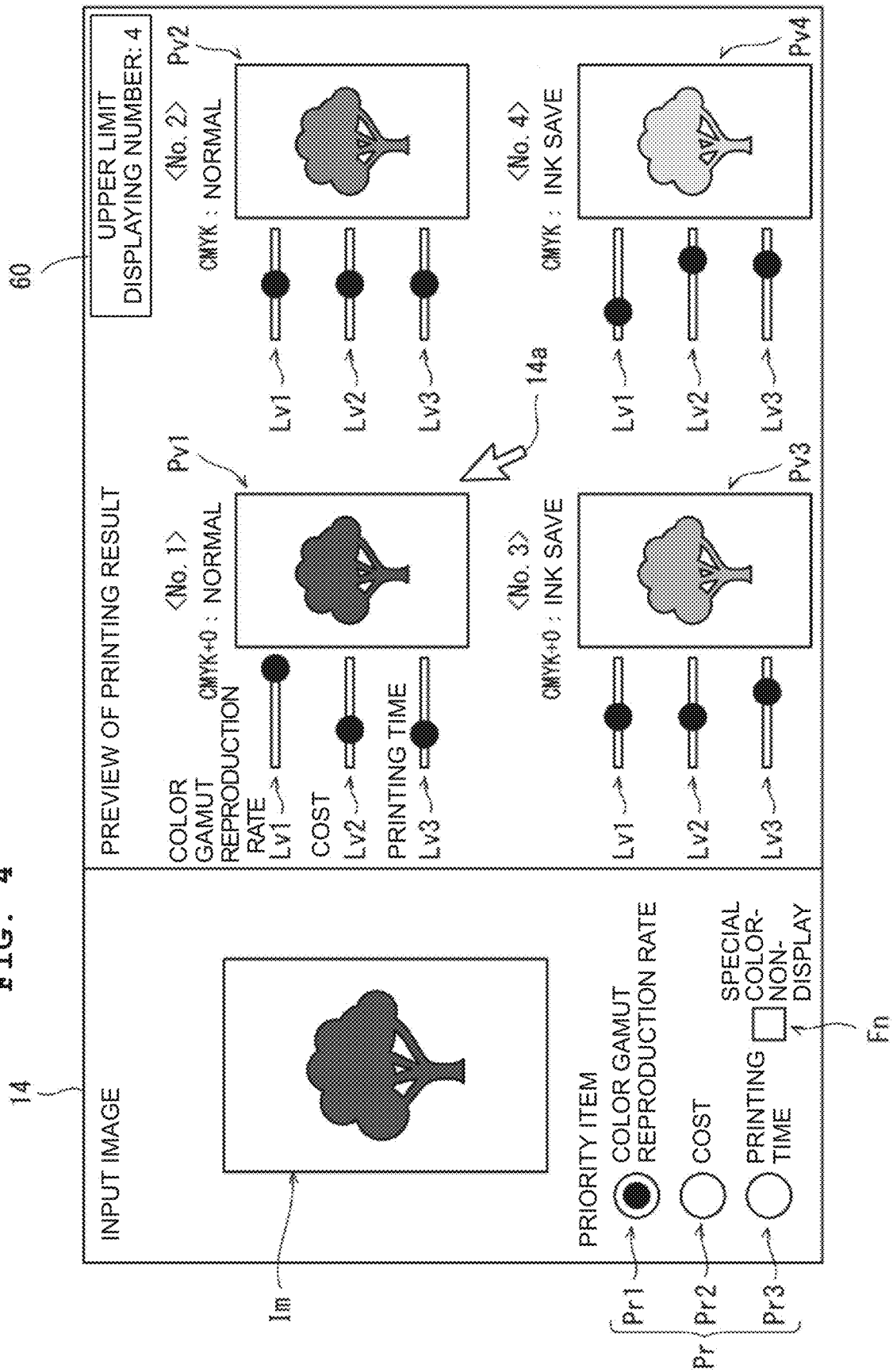
FIG. 4 is a view depicting an example of a preview image displayed on a displaying device.

Next, the preview image displayed on the displaying device 14 will be explained. FIG. 4 is a view depicting an example of preview images Pv1 to Pv4 displayed on the displaying device 14. Note that the preview image is, for example, an image predicting an image quality of an image actually formed on the print medium W by the ink (that is, the image corresponding to the preview image).

The controller 50 receives an input image Im which is an image related to image data transmitted from the external apparatus 200. The color value of this image data is, for example, expressed by an RGB value in an RGB color space as a color coordinate in a device-dependent color space. The RGB value is expressed as one color by a combination of a color value of red in a range of 0 to 255, a color value of green in a range of 0 to 255, and a color value of blue in a range of 0 to 255.

As depicted in FIG. 4, the displaying device 14 displays the following items in accordance with an instruction from the controller 50. The displaying device 14 displays the input image Im. Further, the displaying device 14 displays a priority item Pr to be selected by the user, a special color-non-display item Fn, and an upper limit displaying number item 60. The priority item Pr is an item which is to be prioritized in formation of an image corresponding to the preview image, and includes, for example, a color gamut reproduction rate (color gamut reproduce ratio) Pr1, a cost Pr2 and a printing time Pr3. These priority items Pr, however, are merely examples, and not intended to limit or restrict the present disclosure in any way. The color gamut reproduction rate Pr1 is a reproduction rate of a color gamut (print color gamut) of each of images on the print medium W corresponding respectively to the preview images Pv1 and Pv4. The print color gamut is a gamut occupied by a color value of a color printable by the discharging head 20 in a L*a*b* color space as a predetermined color space. The L*a*b* color space is a device-independent color space, and is a Cartesian coordinates wherein "L" represents brightness (lightness), "a" and "b" represent, respectively, a hue and a chroma. The cost Pr2 is a cost required for formation of each of images, corresponding respectively to the preview images Pv1 to Pv4, on the printing medium W, and is calculated based on the number of dots in discharge data, a liquid droplet amount required for each of the dots, and an ink cost of each of the respective colors. The printing time Pr3 is a total printing time required for formation of each of images corresponding respectively to the preview images Pv1 to Pv4 on the print medium W, and is calculated based on an inputted image, the number of pass(es), a printing speed, a drying time, etc.

In a case that the priority item Pr includes the color gamut reproduction rate Pr1 and the cost Pr2, the controller 50 causes the user to select either one of the color gamut reproduction rate Pr1 and the cost Pr2. Further, the controller 50 generates a plurality of pieces of image data (first image data, second image data, third image data, and fourth image data) corresponding respectively to the preview images Pv1 to Pv4, in accordance with the priority item Pr selected by the user. The controller 50 sorts the plurality of pieces of image data which is generated by the controller 50 and which corresponds respectively to the preview images Pv1 to Pv4 in an order of highness and lowness in the priority item Pr. With this, the preview images Pv1 to Pv4 are displayed on the displaying device 14 in the order of highness or in the order of lowness of the color gamut reproduction rate Pr1 or the cost Pr2 (that is, based on the priority item Pr indicated by one of the plurality of items selected by the user).

Alternatively, in a case that the priority item Pr includes the color gamut reproduction rate Pr1 and the printing time Pr3, the controller 50 causes the user to select either one of the color gamut reproduction rate Pr1 and the printing time Pr3. Further, the controller 50 generates a plurality of pieces of image data (first image data, second image data, third image data, and fourth image data) corresponding respectively to the preview images Pv1 to Pv4, in accordance with the priority item Pr selected by the user. The controller 50 sorts the plurality of pieces of image data which is generated by the controller 50 and which corresponds respectively to the preview images Pv1 to Pv4 in an order of highness and lowness in a case that the priority item Pr is the color gamut reproduction rate Pr1, and in an order of largeness and smallness in a case that the priority item Pr is the printing time Pr3. With this, the preview images Pv1 to Pv4 are displayed on the displaying device 14 in the order of the highness or in the order of lowness of the color gamut reproduction rate Pr1, or the preview images Pv1 to Pv4 are displayed on the displaying device 14 in the order of largeness or in the order of smallness of the printing time Pr3 (that is, based on the priority item Pr indicated by one of the plurality of items selected by the user).

Still alternatively, in a case that the priority item Pr includes the cost Pr2 and the printing time Pr3, the controller 50 causes the user to select either one of the cost Pr2 and the printing time Pr3. Further, the controller 50 generates a plurality of pieces of image data (first image data, second image data, third image data, and fourth image data) corresponding respectively to the preview images Pv1 to Pv4, in accordance with the priority item Pr selected by the user. The controller 50 sorts the plurality of pieces of image data which is generated by the controller 50 and which corresponds respectively to the preview images Pv1 to Pv4 in the order of highness and lowness in a case that the priority item Pr is the cost Pr3, and in the order of largeness and smallness in a case that the priority item Pr is the printing time Pr3. With this, the preview images Pv1 to Pv4 are displayed on the displaying device 14 in the order of the highness or in the order of lowness of the cost Pr2, or the preview images Pv1 to Pv4 are displayed on the displaying device 14 in the order of largeness or in the order of smallness of the printing time Pr3 (that is, based on the priority item Pr indicated by one of the plurality of items selected by the user).

In the aspect depicted in FIG. 4, the priority item includes the color gamut reproduction rate Pr1, the cost Pr2 and the printing time Pr3, as described above. In a case that the user wishes to prioritize the color gamut reproduction rate in the formation of image, the user is capable of selecting the color gamut reproduction rate Pr1 by a pointer 14a. Further, in a case that the user wishes to prioritize the cost in the formation of image, the user is capable of selecting the cost Pr2 with the pointer 14a. Furthermore, in a case that the user wishes to prioritize the total printing time in the formation of image, the user is capable of selecting the printing time Pr3 with the pointer 14a. Note that FIG. 4 depicts an example wherein the color gamut reproduction rate Pr1 is selected by the user, as the priority item Pr. Note that displaying the priority items Pr on the displaying device 14 is an example of "a processing of presenting the user with a plurality of items each indicating a priority item".

By checking the special color-non-display item Fn with the pointer 14a, the user is capable of not causing a preview image corresponding to an image formed by the basic color inks and the special color ink to be displayed on the displaying device 14. With this, the user is capable of visually confirming a preview image corresponding to an image formed only by the basic color inks in the displaying device 14. FIG. 4 depicts an example wherein the special color-non-display item Fn is not checked. Further, the user is capable of selecting an upper limit of the number of the preview image to be displayed (upper limit displaying number) in the upper limit displaying number item 60 with the pointer 14a. The upper limit displaying number item 60 is constructed, for example, of a pull-down form, and the user is capable of selecting one of upper limit displaying number among a plurality of predetermined upper limit displaying numbers. FIG. 4 depicts an example wherein "4 (four)" is selected in the upper limit displaying number item 60. With this, the preview image to be displayed on the displaying device 14 is the following four preview images Pv1 to Pv4.

The controller 50 causes the display device 14 to display the preview images Pv1 to Pv4 in the order of highness of the color gamut reproduction rate Pr1 selected by the user as the priority item Pr.

The preview image Pv1 corresponds to a "second preview image", and corresponds to an image formed, based on the image data, by both of the basic color inks and the special color ink (corresponding to a "second image"). The preview image Pv1 is an image in which the color gamut reproduction rate Pr1 is maximized to be thereby allowed to have a color value which is same as a color value (a color value in the print color gamut) of the input image Im. Further, the preview image Pv2 corresponds to a "first preview image", and corresponds to an image formed, based on the image data, only by the basic color inks (corresponding to a "first image"). The color gamut reproduction rate Pr1 of the preview image Pv2 is lower than the color gamut reproduction rate Pr1 of the preview image Pv1. The controller 50 generates the preview image Pv2 based on a decrease value in the color gamut reproduction rate Pr1 of the preview image Pv2, with the color gamut reproduction rate Pr1 of the preview image Pv1 as the reference. This is similarly appliable also in the following. The displaying device 14 displays the preview image Pv1 together with the preview image Pv2. Note that the wording of "displaying a first image together with a second image" means displaying the first image and the second image different from the first image on a display in a state that a user can visually perceive the first image and the second image at the same time, and the first image and the second image may be adjacent to each other or may be separated from each other.

The preview image Pv3 corresponds to a "fourth preview image" and corresponds to an image formed, based on the image data, by the basic color inks in an ink amount which is smaller as compared with an ink amount of the basic color inks in formation of the above-described second image and by the special color ink in an ink amount which is smaller as compared with an ink amount of the special color ink in the formation of the second image (an image at a time of ink save, and corresponding to a "fourth image"). The color gamut reproduction rate Pr1 of the preview image Pv3 is lower than the color gamut reproduction rate Pr1 of the preview image Pv2. Further, the preview image Pv4 corresponds to a "third preview image" and corresponds to an image formed, based on the image data, by the basic color inks in an ink amount which is smaller as compared with an ink amount of the basic color inks in formation of the first image (an image at a time of ink save, and corresponding to a "third image"). The color gamut reproduction rate Pr1 of the preview image Pv4 is lower than the color gamut reproduction rate Pr1 of the preview image Pv3. The controller 50 sorts the plurality of pieces of image data which corresponds respectively to the preview images Pv1 to Pv4 in an order of highness of the color gamut reproduction rate Pr1. Afterwards, the displaying device 14 displays the preview images Pv3 and Pv4, together with the preview images Pv1 and Pv2.

The displaying device 14 displays a level bar indicating an extent of highness or largeness of each of the priority items Pr corresponding to one of the preview images Pv1 to Pv4. Specifically, a level bar Lv1 corresponding to the color gamut reproduction rate Pr1, a level bar Lv2 corresponding to the cost Pv2 and a level bar Lv3 corresponding to the printing time Pr3 are displayed for each of the preview images Pv1 to Pv4. The level bar Lv1 indicates an extent of highness of the color gamut reproduction rate Pr1 at a time of forming the image corresponding to the preview image. One end side (a right end side in FIG. 4) of the level bar Lv1 indicates the maximum value of the color gamut reproduction rate Pr1, and the other end side (a left end side in FIG. 4) indicates the minimum value of the color gamut reproduction rate Pr1. Further, the level bar Lv2 indicates an extent of highness of the cost Pr2 at a time of forming the image corresponding to the preview image. One end side (a right end side in FIG. 4) of the level bar Lv2 indicates the minimum value of the cost Pr2, and the other end side (a left end side in FIG. 4) indicates the maximum value of the cost Pr2. Furthermore, the level bar Lv3 indicates an extent of largeness of the printing time Pr3 at a time of forming the image corresponding to the preview image. One end side (a right end side in FIG. 4) of the level bar Lv3 indicates the minimum value of the printing time Pr3, and the other end side (a left end side in FIG. 4) indicates the maximum value of the printing time Pr3. Note that the value of each of the level bar Lv2 and the level bar Lv3 is determined in accordance with the value of the level bar Lv1.

The user is capable of selecting any one of the preview images Pv1 to Pv4 with the pointer 14a. In this case, the user selects a preview image, among the preview images Pv1 to Pv4, which is considered, by the user, to have an optimum quality.

Based on a preview image, which is included in the preview images Pv1 to Pv4 and which has been selected by the user, the controller 50 executes a processing of printing an image corresponding to the selected preview image by using the first nozzles 28, or a processing of printing the image corresponding to the selected preview image by using the first nozzles 28 and the second nozzles 29. Specifically, in a case that the preview image Pv1 is selected by the user, the controller 50 executes a processing of printing an image corresponding to the preview image Pv1 by using the first nozzles 28 and the second nozzles 29. On the other hand, in case that the preview image Pv2 is selected by the user, the controller 50 executes a processing of printing an image corresponding to the preview image Pv2 by using the first nozzles 28.

Further, in a case that the preview image Pv3 is selected by the user, the controller 50 executes a processing of printing an image corresponding to the preview image Pv3 by using the first nozzles 28 and the second nozzles 29. On the other hand, in case that the preview image Pv4 is selected by the user, the controller 50 executes a processing of printing an image corresponding to the preview image Pv4 by using the first nozzles 28.

Here, in a case that the controller 50 causes the displaying device 14 to display the preview images Pv1 to Pv4, the controller 50 receives an instruction of turning a flag, indicating that the preview image Pv1 and the preview image Pv3 each of which corresponds to the image using the special color ink are unnecessary is received from the user. In this case, the controller 50 determines as to whether or not the above-described flag is turned on based on whether or not the special color-non-display item Fn is checked. In a case that the special color-non-display item Fn is checked by the user, the controller 50 turns the flag on; whereas in a case that the special color-non-display item Fn is not checked by the user, the controller 50 does not turn the flag on.

In a case that the controller 50 turns the flag on based on the instruction of the user, the controller 50 generates only the preview images Pv2 and Pv4, without generating the preview images Pv1 and Pv3, and causes the displaying device 14 to display only the preview images Pv2 and Pv4. With this, the user is capable of eliminating the displaying of the preview images Pv1 and Pv3, based on his or her own will that the preview images Pv1 and Pv3 each corresponding to the image using the special color ink are unnecessary.

Further, even in a case that the controller 50 turns the flag on once based on the instruction of the user, it is acceptable that the controller 50 generates the preview images Pv1 and Pv3 after a predetermined time elapses since the controller 50 has turned the flag on, and that the controller 50 causes the displaying device 14 to display the preview images Pv1 and Pv3. In this case, the controller 50 has a count function of keeping time since the controller 50 has turned the flag on; in a case that the result of keeping the time reaches the predetermined time, the controller 50 turns the flag off and causes the displaying device 14 to display the preview images Pv1 and Pv3.

Figure 5:
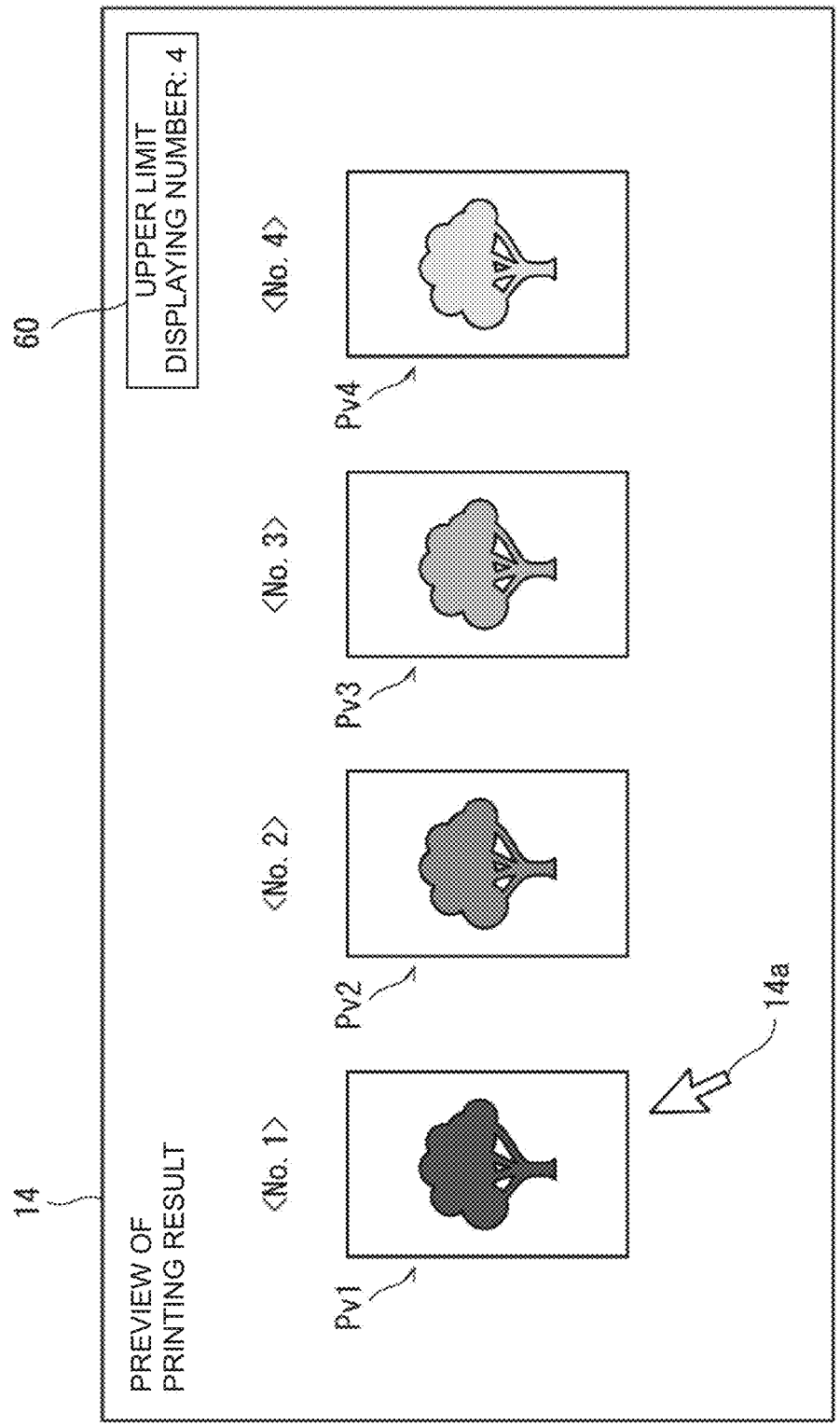
FIG. 5 is a view depicting another example of the preview image displayed on the displaying device.

FIG. 5 is a view depicting another example of the preview images Pv1 to Pv4 displayed on the displaying device 14. It is acceptable that, after the controller 50 causes the user to select the priority item Pr as described above, the controller 50 displays the preview images Pv1 to Pv4 in a manner that the preview images Pv1 to Pv4 are aligned in a row, as depicted in FIG. 5. With this, it is expected that the user is capable of easily recognizing a visual difference among the respective preview images Pv1 to Pv4. Note that in FIG. 5, the illustration of the level bars Lv1, Lv2 and Lv3 is omitted.

Figure 6:
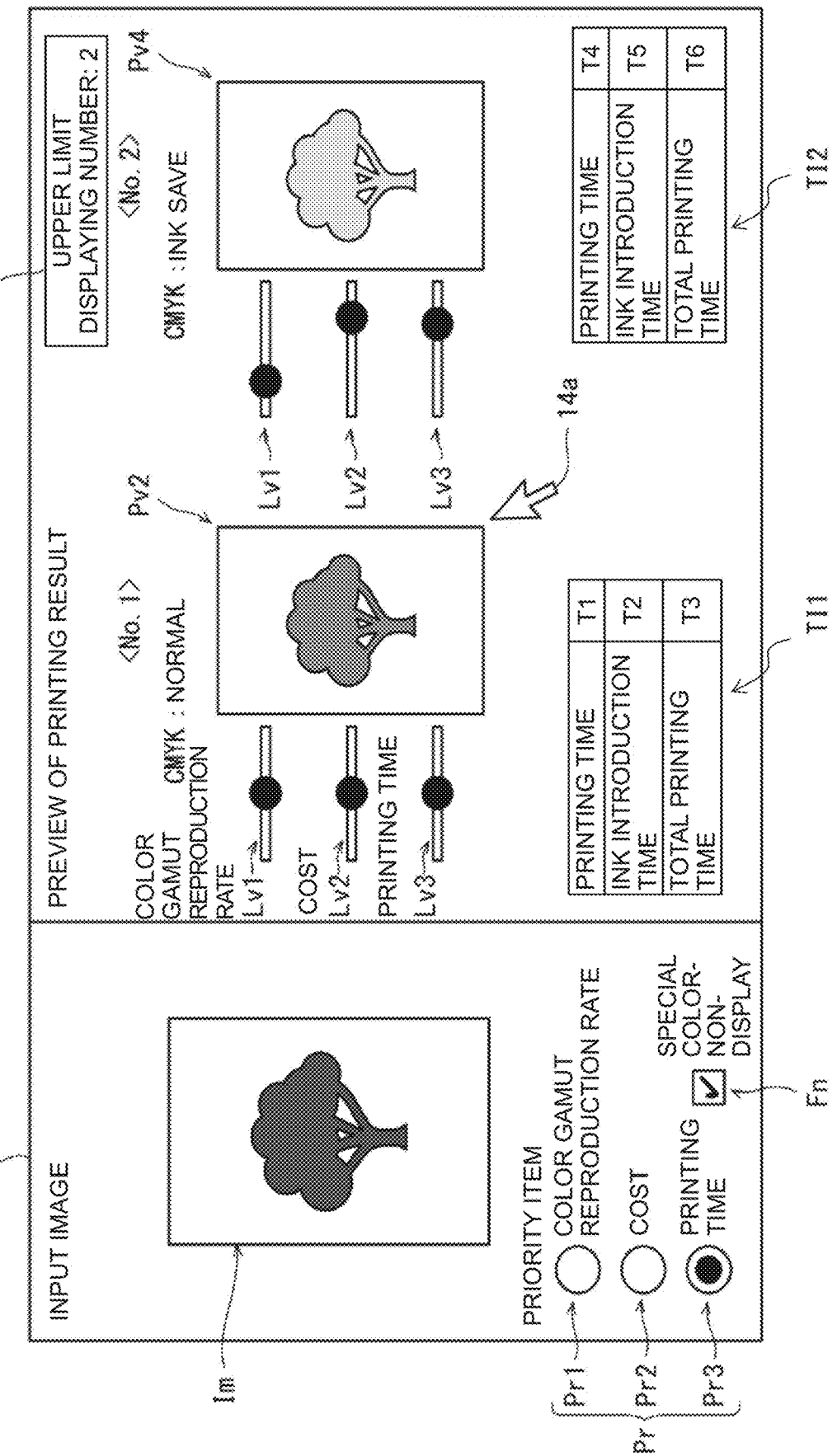
FIG. 6 is a view depicting an aspect wherein the preview image and a value regarding a priority item are displayed in the displaying device.

Here, it is acceptable to display the value regarding the priority item Pr selected by the user, together with the preview image, on the displaying device 14. FIG. 6 is a view depicting an aspect wherein the preview images Pv2 and Pv4 and a value regarding the priority items Pr are displayed in the displaying device 14. Note that FIG. 6 depicts an aspect wherein the special color-non-display item Fn is checked by the user, and thus the preview images Pv1 and Pv3 are not displayed on the displaying device 14.

The controller 50 calculates the value regarding the priority item Pr selected by the user before the controller 50 causes the displaying device 14 to display the preview images. In FIG. 6, the priority item Pr selected by the user is the printing time Pr3. The controller 50 calculates information TI1 regarding the printing of the image corresponding to the preview image Pv2 and information TI2 regarding the printing of the image corresponding to the preview image Pv4, as the value regarding the priority item Pr selected by the user. The information TI1 includes a printing time T1 by the discharging head 20, an ink introduction time T2 which is a time required for introducing the ink to the nozzles 27, and a total printing time T3 which is a total time of the printing time T1 and the ink introduction time T2. Similarly, the information TI2 also includes a printing time T4, an ink introduction time T5 and a total printing time T6. The ink introduction times T2, T5 may include a cleaning time (washing time) of the nozzles 27. The cleaning time of the nozzles 27 is a time required for discharging (ejecting, exhausting), from the nozzles 27, a cleaning liquid (cleaning solution) of a transparent color filled in the ink cartridge. Note that in a case that the priority item Pr selected by the user is the cost Pr2, the information TI1 and the information TI2 are each information regarding a printing cost. Further, in a case that the priority item Pr selected by the user is the color gamut reproduction rate Pr1, the information TI1 and the information TI2 are each information regarding the color gamut reproduction rate.

As depicted in FIG. 6, the controller 50 causes the displaying device 14 to display the information TI1 and the information TI2 which the controller 50 has calculated, together with the preview images Pv2 and Pv4. In this case, the controller 50 causes the displaying device 14 to display the total printing time T3 while being separated into the printing time T1 and the ink introduction time T2, and to display the total printing time T6 while being separated into the printing time T4 and the ink introduction time T5.

Figure 7:
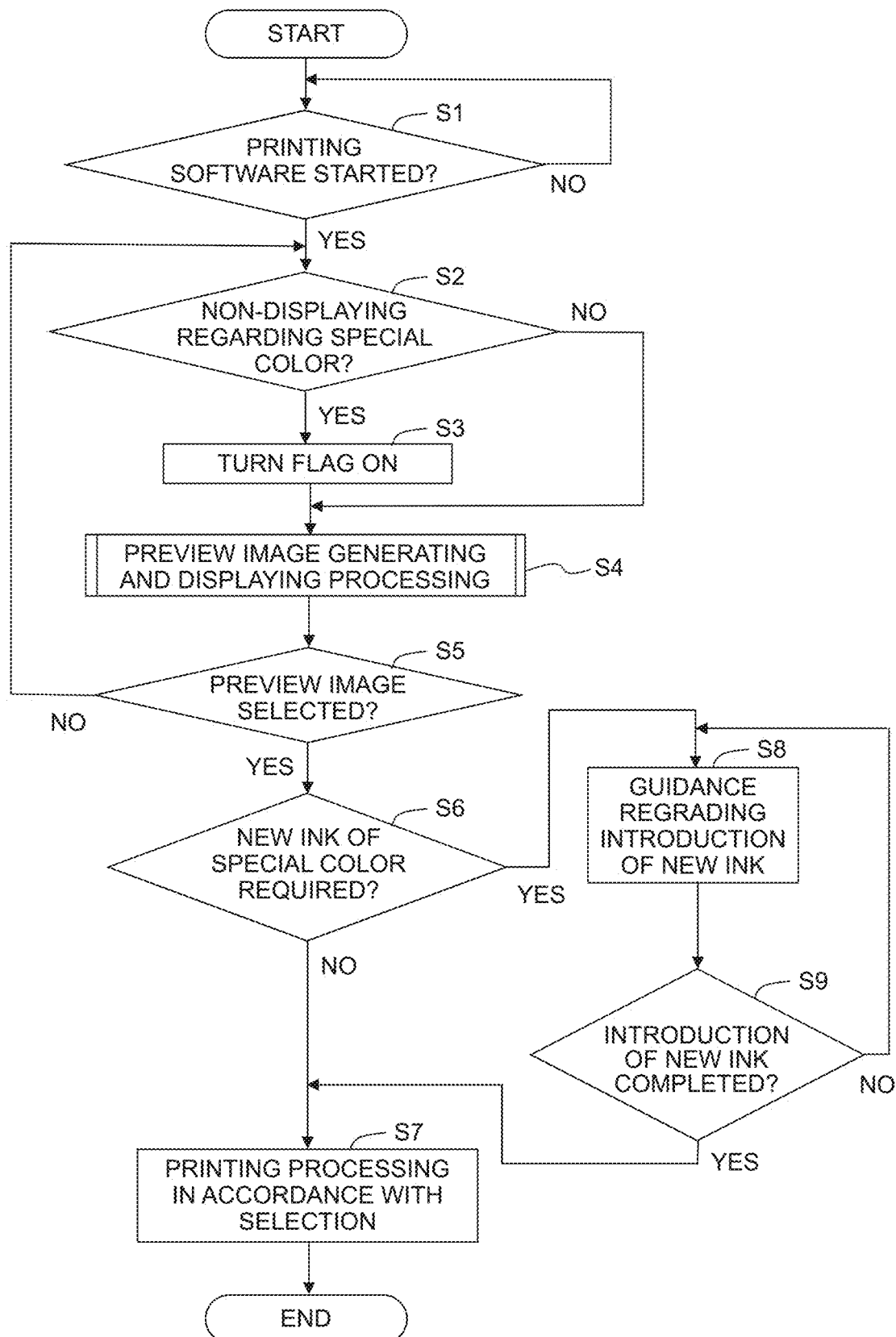
FIG. 7 is a flow chart indicating a printing method by the printing apparatus of FIG. 1.
Figure 8:
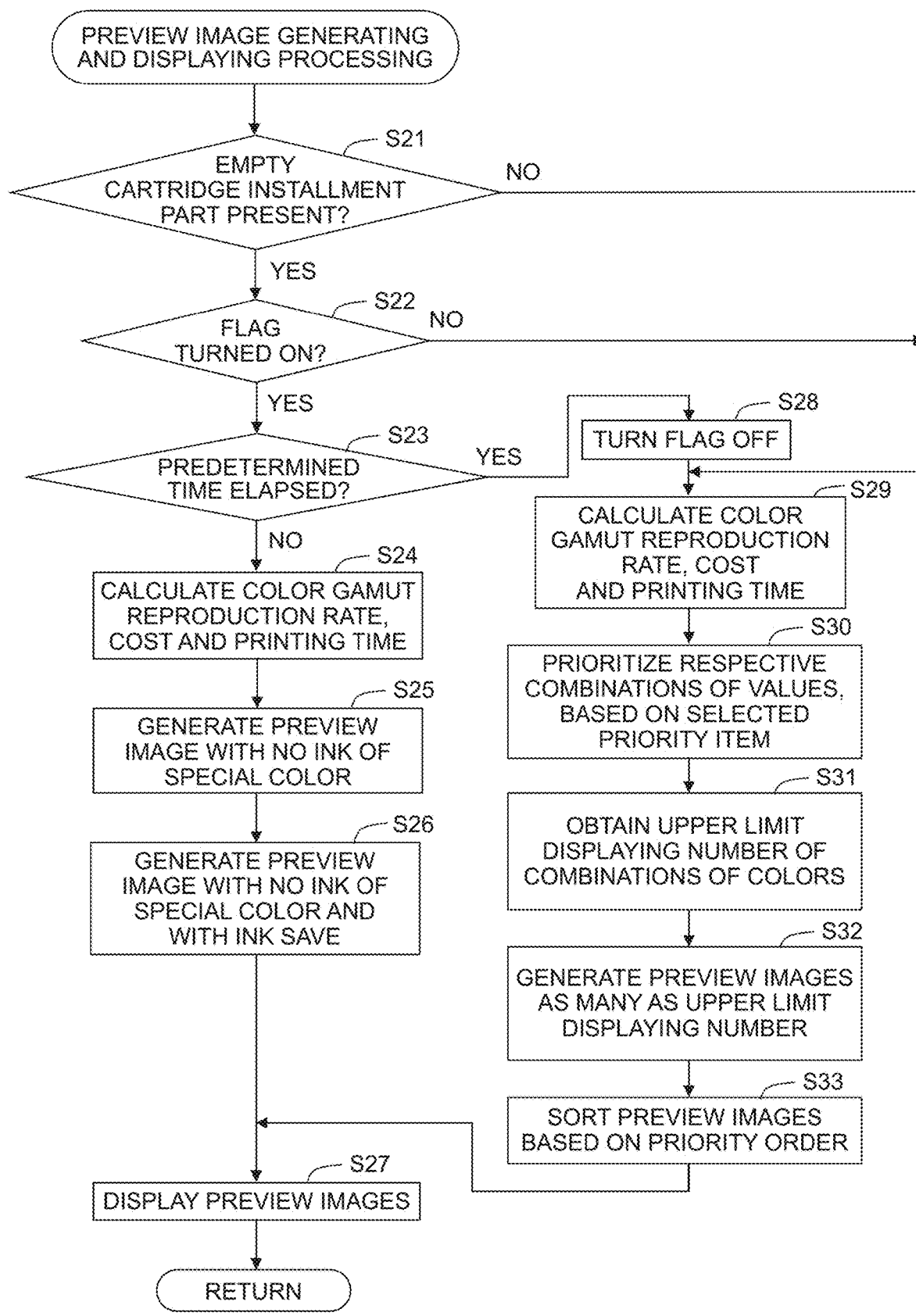
FIG. 8 is a flow chart indicating a sub routine related to a preview image generating and displaying processing of FIG. 7.

FIG. 7 is a flow chart indicating a printing method by the printing apparatus 1 of FIG. 1. FIG. 8 is a flow chart indicating a sub routine related to a preview image generating and displaying processing of FIG. 7.

As depicted in FIG. 7, at first, the controller 50 determines as to whether or not a printing software is started by the user (step S1). Next, the controller 50 determines as to whether or not the special color-non-display item Fn is checked by the user (step S2). In a case that the special color-non-display item Fn is checked by the user (step S2: YES), the controller 50 turns the flag on (step S3). In a case that the special color-non-display item Fn is not checked by the user (step S2: NO), the controller 50 executes the preview image generating and displaying processing (step S4).

As depicted in FIG. 8, in the preview image generating and displaying processing, at first, the controller 50 determines as to whether or not there is a vacant (empty) cartridge installment part, based on a result of detection by a predetermined sensor (step S21). In a case that there is a vacant cartridge installment part (step 21: YES), the controller 50 determines as to whether or not the flag is turned on (step S22). In a case that the flag is turned on (step S22: YES), the controller determines as to whether or not the predetermined time elapses since the flag has been turned on (step S23).

In a case that the predetermined time does not elapse since the flag has been turned on (step S23: NO), the controller 50 calculates the respective values of the color gamut reproduction rate Pr1, the cost Pr2 and the printing time Pr3, based on the input image Im and the priority item Pr selected by the user (step S24). The controller 50 reflects the respective values calculated by the controller 50 to the level bars Lv1, Lv2 and Lv3 corresponding thereto, respectively.

Next, the controller 50 generates the preview image related to the basic color inks, for example, the preview image Pv2 in FIG. 6, without generating the preview image related to the special color ink (step S25). Subsequently, the controller 50 generates the preview image related to the basic color inks and to the ink save, for example, the preview image Pv4 in FIG. 6 (step S26). Afterwards, the controller 50 causes the displaying device 14 to display the preview images Pv2 and Pv4 (step S27).

On the other hand, in a case that the predetermined time elapses since the flag has been turned on (step S23: YES), the controller 50 turns the flag off (step S28). In a case that after the processing of step S28, there is no vacant cartridge installment part (step S21: NO) or that the flag is not turned on (step S22: NO), the controller 50 calculates the respective values of the color gamut reproduction rate Pr1, the cost Pr2 and the printing time Pr3, based on the input image Im and the priority item Pr selected by the user (step S29). The controller 50 reflects the respective values calculated by the controller 50 to the level bars Lv1, Lv2 and Lv3 corresponding thereto, respectively.

Next, the controller 50 prioritize the respective values which the controller 50 has calculated, based on the priority item Pr selected by the user (step S30). Specifically, the controller 50 prioritize a plurality of combinations, each of the combinations being formed of one of the respective values of the color gamut reproduction rate Pr1, one of the respective values of the cost Pr2 and one of the respective values of the printing time Pr3. Then, the controller 50 obtains the upper limit displaying number of the preview image designated by the user (step S31).

Next, the controller 50 generates preview images as many as the upper limit displaying number (step S32). In this case, for example, since the upper limit displaying number is designated as "four" in FIG. 4, on the premise that the controller 50 generates two preview images related to the basic color inks which are the preview image Pv2 (a preview image at a normal time) and the preview image Pv4 (a preview image at the time of ink save), the preview images related to the special color ink to be generated by the controller 50 are, consequently, two (the preview images Pv1 and Pv3).

Next, the controller 50 sorts the four preview images Pv1 to Pv4 based on the priority order determined in step S30 (step S33). For example, in FIG. 4, since the priority item Pr selected by the user is the color gamut reproduction rate Pr1, the controller 50 sorts the plurality of pieces of the image data which corresponds respectively to the preview images Pv1 to Pv4 in the order of highness of the color gamut reproduction rate Pr1. Afterwards, the controller 50 causes the displaying device 14 to display the preview images Pv1 to Pv4 in accordance with the above-described order (step S27).

After the processing of step S27, the controller 50 returns to the flow chart related to the main routine of FIG. 7, and the controller 50 determines as to whether or not any one of the preview images Pv1 to Pv4 is selected by the user (step S5 of FIG. 7). In a case that the preview image is not selected (step S5: NO), the controller 50 returns to the processing of step S2. On the other hand, in a case that the preview image is selected (step S5: YES), the controller 50 determines as to whether or not any new ink of the special color is required so as to form an image corresponding to the selected preview image, based on the selected preview image (step S6).

In a case that any new ink of the special color (new special color ink) is not required (step S6: NO), the controller 50 causes the discharging head 20 to print the image corresponding to the preview image selected by the user (step S7). On the other hand, in a case that the new special color ink is required (step S6: YES), the controller 50 executes a guidance regarding introduction of the new special color ink (step S8). In this case, for example, the controller 50 causes the displaying device 14 to display a notification that the new special color ink is required. With this, the user is capable of grasping that the introduction of the new special color ink is required, by visually confirming the displaying device 14.

Subsequently, the controller 50 determines as to whether or not the new special color ink is introduced by the user (step S9). In this case, the controller 50 is capable of performing the above-described determination based on a result of detection by the sensor as to whether or not a cartridge of the new special color ink has been installed in the installment part. In a case that the new special color ink is not introduced by the user (step S9: NO), the controller 50 returns to the processing of step S8; in a case that the new special color ink is introduced by the user (step S9: YES), the controller 50 causes the discharging head 20 to print an image corresponding to the preview image selected by the user (step S7). With this, the processing by the controller 50 is ended.

As explained above, according to the printing apparatus 1 of the present embodiment, the four preview images Pv1 to Pv4 are displayed together on the displaying device 14, and the user is capable of selecting any one of the preview images Pv1 to Pv4. In this case, in a case that the user determines that a change in the image quality which is obtained by adding the special color ink is small, the user is capable of selecting the preview image Pv2 or the preview image Pv4. In contrast, in a case that the user determines that the change in the image quality which is obtained by adding the special color ink is great, the user is capable of selecting the preview image Pv1 or the preview image Pv3. Owing to the foregoing, the user is capable of easily grasping the change in image quality depending on the presence or absence of addition of the special color ink.

Further, in the present embodiment, the preview images Pv3 and Pv4 each of which corresponds to the image formed at the time of ink save are displayed on the displaying device 14. With this, the user is capable of grasping a change in the image quality at the time of ink save.

Furthermore, in the present embodiment, the preview images Pv1 to Pv4 are displayed in a manner that the preview images Pv1 to Pv4 are sorted in the order of highness and lowness in a case that the priority item Pr selected by the user is the color gamut reproduction rate Pr1, in the order of highness and lowness in a case that the priority item Pr selected by the user is the cost Pr2, and in the order of largeness and smallness in a case that the priority item Pr selected by the user is the printing time Pr3. With this, the user is capable of easily grasping the change in image quality based on the priority item Pr selected by the user himself or herself.

Moreover, in the present embodiment, in a case that the controller 50 turns the flag on based on the instruction of the user, the controller 50 does not perform the generation of the preview image Pv1 and the preview image Pv3, generates only the preview image Pv2 and the preview image Pv4 and causes the displaying device 14 to display only the preview images Pv2 and Pv4. With this, the user is capable of eliminating the displaying of the preview images Pv1 and Pv3 which the user determined to be unnecessary.

Further, in the present embodiment, even in a case that the controller 50 turns the flag on once based on the instruction of the user, it is acceptable that the controller 50 generates the preview images Pv1 and Pv3 after elapse of the predetermined time since the controller 50 has turned the flag on, and that the controller 50 causes the displaying device 14 to display the preview images Pv1 and Pv3. With this, it is possible to urge the user to reconsider the selection of the preview image by the user.

Furthermore, in the present embodiment, the controller 50 turns the flag off after elapse of the predetermined time since the controller 50 has turned the flag on. With this, it is possible to clarify a trigger for generating the preview images Pv1 and Pv3 and for causing the displaying device to display the preview images Pv1 and Pv3 thereon.

Moreover, in the present embodiment, the values regarding the priority item Pr selected by the user are displayed on the displaying device 14, together with the preview images. With this, the user is capable of specifically grasping the values regarding the priority item Pr. With this, the user is capable of easily selecting a preview image which further meets the demand of the user.

Further, in the present embodiment, the information TI1 displayed on the displaying device 14 includes the printing time T1 by the discharging head 20, the ink introduction time T2 and the total printing time T3 which is the total time of the printing time T1 and the ink introduction time T2. With this, the user is capable of recognizing a more suitable total printing time, as compared with a case that the ink introduction time is not included in the total printing time.

Furthermore, in the present embodiment, the printing time T1, the ink introduction time T2 and the total printing time T3 are displayed separately from one another on the displaying device 14. With this, the user is capable of visually confirming the respective times T1 to T3.

Moreover, in the present embodiment, the ink introduction times T2 and T5 may include the cleaning time of the nozzles 27. In this case, the user is capable of recognizing the time required for the ink introduction more appropriately.

<Modifications>

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

In the above-described embodiment, the priority item Pr may include all of the color gamut reproduction rate Pr1, the cost Pr2 and the printing time Pr3, as depicted in FIG. 4. Alternatively, the priority item Pr may include only two among the color gamut reproduction rate Pr1, the cost Pr2 and the printing time Pr3.

Further, in the above-described embodiment, although the controller 50 causes the displaying device 14 to display the preview images Pv1 to Pv4 in the order of highness of the color gamut reproduction rate Pr1, the present disclosure is not limited to this. It is acceptable that the controller 50 causes the displaying device 14 to display the preview images Pv1 to Pv4 in an order of lowness of the color gamut reproduction rate Pr1.

Furthermore, in the above-described embodiment, although the controller 50 causes the displaying device 14 to display each of the preview images Pv1 to Pv4, it is allowable that the controller 50 causes the displaying device 14 to display at least the preview images Pv1 and Pv2, and the displaying of the preview images Pv3 and Pv4 is not essential. Moreover, it is acceptable that the controller 50 causes the displaying device 14 to display the preview images Pv1 and Pv2, and also either one of the preview images Pv3 and Pv4.

Further, in the above-described embodiment, there is such a case that the displaying device 14 might not be able to display an image (including a preview image) which is completely same as an image printed by the discharging head 20 on the print medium W. However, even such a case that the displayed image is not completely same as the printed image on the printing medium W is also encompassed or included in the range of equivalent. For example, a preview image generated with an intention to exhibit the quality of an image to be formed on a print medium by an ink will be regarded as the preview image, even if the image quality of the preview image is not completely same as the image quality of the image actually formed on the medium by the ink.

Furthermore, in the above-described embodiment, the discharging head 20 may include, for example, one piece or a plurality of pieces of a discharging head configured to discharge a base color ink, which is an ink of a color of a base (base layer) such as a white ink, etc.

Moreover, in the above-described embodiment, although the displaying device 14 of the printing apparatus 1 is caused to display the preview images Pv1 to Pv4, the present disclosure is not limited to this. It is also acceptable to display the preview images Pv1 to Pv4 on a display of a personal computer, etc., which is capable of performing a wired or wireless communication with respect to the printing apparatus 1.

Further, in the above-described embodiment, in a case that the controller 50 causes the displaying device 14 to display the preview images Pv1 to Pv4, the controller 50 receives, from the user, the instruction of turning on the flag indicating that the preview image Pv1 and the preview image Pv3 each corresponding to the image using the special color ink are not necessary. The present disclosure, however, is not limited to this. It is acceptable that, in a case that the controller 50 causes the displaying device 14 to display the preview images Pv1 to Pv4, the controller 50 receives, from the user, an instruction of turning on a flag indicating that the preview image Pv1 and the preview image Pv3 each corresponding to the image using the special color ink are necessary. In this case, the controller 50 determines as to whether or not the flag is turned on, depending on whether or not the special color-non-display item Fn is checked by the user. In a case that the special color-non-display item Fn is checked by the user, the controller 50 turns the flag off, and in a case that the special color-non-display item Fn is not checked by the user, the controller 50 does not turn the flag off.

Furthermore, although the displaying device 14 displays the special color-non-display item Fn in the above-described embodiment, the present disclosure in not limited to this. It is acceptable that the displaying device 14 displays a special color-display item. In this case, the controller 50 receives, from the user, an instruction of turning on a flag indicating that the preview image Pv1 and the preview image Pv3 each corresponding to the image using the special color ink are necessary. In a case that the special color-display item is checked by the user, the controller 50 turns the flag on, whereas in a case that the special color-display item is not checked by the user, the controller 50 turns the flag off. Note that the following aspect may be adopted. That is, in a case that the special color-display item is checked by the user, the controller 50 turns the flag off; in a case that the flag is turned off, the controller 50 causes the displaying device 14 to display the preview images Pv1 to Pv4. In a case that the special color-display item is not checked by the user, the controller 50 turns the flag on; in a case that the flag is turned on, the controller 50 does not cause the displaying device 14 to display the preview image Pv1 and the preview image Pv3 each corresponding to the image using the special color ink.

What is claimed is:

1. A printing apparatus comprising:
a first nozzle configured to discharge an ink of a basic color to a print medium based on image data;
a second nozzle configured to discharge an ink of a special color different from the basic color to the print medium based on the image data; and
a controller,
wherein the controller is configured to execute:
a processing of causing a display to display a first preview image together with a second preview image, the display being configured to display a preview image based on the image data, the first preview image corresponding to a first image to be formed by the ink of the basic color based on the image data, the second preview image corresponding to a second image to be formed by both of the ink of the basic color and the ink of the special color based on the image data;
a processing of printing the first image by using the first nozzle, or a processing of printing the second image by using the first nozzle and the second nozzle, based on a selected preview image selected, by a user, from the first preview image and the second preview image;
a processing of presenting the user with a plurality of items each indicating a priority item to be prioritized in formation of an image, corresponding to the preview image, on the print medium;
a processing of generating first image data and second image data corresponding to the first preview image and the second preview image respectively; and
a processing of sorting the first image data and the second image data, based on the priority item indicated by one of the plurality of items selected by the user.

2. The printing apparatus according to claim 1, wherein the controller is configured to further execute:
a processing of causing the display to display a third preview image corresponding to a third image to be formed by the ink of the basic color based on the image data, the third image being an image to be formed by the ink of the basic color in a smaller ink amount as compared with an ink amount of the ink of the basic color used in a formation of the first image; and
a processing of printing the third image by using the first nozzle in a case that the third preview image is selected by the user.

3. The printing apparatus according to claim 1, wherein the controller is configured to further execute:
a processing of causing the display to display a fourth preview image corresponding to a fourth image to be formed by both of the ink of the basic color and the ink of the special color based on the image data, the fourth image being an image to be formed by the ink of the basic color in a smaller ink amount as compared with an ink amount of the ink of the basic color used in formation of the second image and by the ink of the special color in a smaller ink amount as compared with an ink amount of the ink of the special color used in the formation of the second image; and a processing of printing the fourth image by using the first nozzle and the second nozzle in a case that the fourth preview image is selected by the user.

4. The printing apparatus according to claim 2, wherein the controller is configured to further execute:
   a processing of causing the display to display a fourth preview image corresponding to a fourth image to be formed by both of the ink of the basic color and the ink of the special color based on the image data, the fourth image being an image to be formed by the ink of the basic color in a smaller ink amount as compared with an ink amount of the ink of the basic color used in formation of the second image and by the ink of the special color in a smaller ink amount as compared with an ink amount of the ink of the special color used in the formation of the second image; and
   a processing of printing the third image by using the first nozzle, or a processing of printing the fourth image by using the first nozzle and the second nozzle, based on a selected preview image selected, by the user, from the third preview image and the fourth preview image.

5. The printing apparatus according to claim 4, wherein:
   the processing of generating the first image data and the second image data includes generating third image data and fourth image data corresponding to the third preview image, and the fourth preview image respectively; and
   the processing of sorting the first image data and the second image data includes sorting the first image data, the second image data, the third image data, and the fourth image data, based on the priority item indicated by the one of the plurality of items selected by the user.

6. The printing apparatus according to claim 5, wherein:
   the priority item includes a color gamut reproduction rate of the image, corresponding to the preview image, on the print medium and a cost required for formation of the image, corresponding to the preview image, on the print medium; and
   the processing of sorting includes sorting the first image data, the second image data, the third image data, and the fourth image data in an order of highness and lowness in the color gamut reproduction rate or the cost.

7. The printing apparatus according to claim 5, wherein:
   the priority item includes a color gamut reproduction rate of the image, corresponding to the preview image, on the print medium and a total printing time required for formation of the image, corresponding to the preview image, on the print medium; and
   the processing of sorting includes sorting the first image data, the second image data, the third image data, and the fourth image data in an order of highness and lowness in the priority item in a case that the priority item is the color gamut reproduction rate, or in an order of largeness and smallness in the priority item in a case that the priority item is the total printing time.

8. The printing apparatus according to claim 5, wherein:
   the priority item includes a cost required for formation of the image, corresponding to the preview image, on the print medium and a total printing time required for the formation of the image, corresponding to the preview image, on the print medium; and
   the processing of sorting includes sorting the first image data, the second image data, the third image data, and the fourth image data in an order of highness and lowness in the priority item in a case that the priority item is the cost, or in an order of largeness and smallness in the priority item in a case that the priority item is the total printing time.

9. The printing apparatus according to claim 4, wherein the controller is configured to execute:
   a processing of determining whether or not a flag is on, in a case of displaying the first preview image, the second preview image, the third preview image, and the fourth preview image, the flag indicating that the second preview image and the fourth preview image are unnecessary; and
   a processing of generating the first preview image and the third preview image, without generating the second preview image and the fourth preview image and causing the display to display the first preview image and the third preview image, in a case that the controller determines that the flag indicating that the second preview image and the fourth preview image are unnecessary is on.

10. The printing apparatus according to claim 9, wherein the controller is configured to execute:
    a processing of receiving, from the user, an instruction to turn the flag on; and
    a processing of turning the flag on in response to the instruction of the user.

11. The printing apparatus according to claim 10, wherein the controller is configured to generate the second preview image and the fourth preview image after a predetermined time elapses since the controller has turned the flag on, and to cause the display to display the second preview image and the fourth preview image.

12. The printing apparatus according to claim 11, wherein the controller is configured to turn the flag off after the predetermined time elapses since the controller has turned the flag on.

13. The printing apparatus according to claim 5, wherein the controller is configured to further execute:
    a processing of calculating a value regarding the priority item indicated by the one of the plurality of items selected by the user, before causing the display to display the first preview image and the third preview image; and
    a processing of causing the display to display the value regarding the priority item indicated by the one of the plurality of items selected by the user, the first preview image, and the third preview image.

14. The printing apparatus according to claim 7, wherein the total printing time includes an ink introduction time being a time required for introducing an ink to the first nozzle and/or the second nozzle.

15. The printing apparatus according to claim 14, wherein the controller is configured to cause the display to display the total printing time while separating the total printing time into the ink introduction time and a printing time being a time required for performing printing by the first nozzle and/or the second nozzle to the print medium.

16. The printing apparatus according to claim 14, wherein the ink introduction time includes a cleaning time of the first nozzle and/or the second nozzle.

17. The printing apparatus according to claim 1, further comprising the display configured to display the preview image based on the image data.

18. A printing method used in a printing apparatus, the printing apparatus including:
    a first nozzle configured to discharge an ink of a basic color to a print medium based on image data; and a second nozzle configured to discharge an ink of a special color different from the basic color to the print medium based on the image data, the method comprising:

displaying, on a display, a first preview image together with a second preview image, the display being configured to display a preview image based on the image data, the first preview image corresponding to a first image to be formed by the ink of the basic color based on the image data, the second preview image corresponding to a second image to be formed by both of the ink of the basic color and the ink of the special color based on the image data;

printing the first image by using the first nozzle, or printing the second image by using the first nozzle and the second nozzle, based on a selected preview image selected, by a user, from the first preview image and the second preview image;

presenting the user with a plurality of items each indicating a priority item to be prioritized in formation of an image, corresponding to the preview image, on the print medium;

generating first image data and second image data corresponding to the first preview image and the second preview image respectively; and sorting the first image data and the second image data, based on the priority item indicated by one of the plurality of items selected by the user.

19. A non-transitory computer-readable medium storing a print program that is executable by a controller of a printing apparatus, the printing apparatus including:

a first nozzle configured to discharge an ink of a basic color to a print medium based on image data; and a second nozzle configured to discharge an ink of a special color different from the basic color to the print medium based on the image data, the program is configured to cause the controller to:

display, on a display, a first preview image together with a second preview image, the display being configured to display a preview image based on the image data, the first preview image corresponding to a first image to be formed by the ink of the basic color based on the image data, the second preview image corresponding to a second image to be formed by both of the ink of the basic color and the ink of the special color based on the image data;

print the first image by using the first nozzle, or print the second image by using the first nozzle and the second nozzle, based on a selected preview image selected, by a user, from the first preview image and the second preview image;

present the user with a plurality of items each indicating a priority item to be prioritized in formation of an image, corresponding to the preview image, on the print medium;

generate first image data and second image data corresponding to the first preview image and the second preview image respectively; and sort the first image data and the second image data, based on the priority item indicated by one of the plurality of items selected by the user.

* * * * *